(12) United States Patent
Kimura

(10) Patent No.: US 8,941,889 B2
(45) Date of Patent: Jan. 27, 2015

(54) OVERHEAD IMAGE READING APPARATUS

(71) Applicant: PFU Limited, Kahoku-shi, Ishikawa (JP)

(72) Inventor: Keisuke Kimura, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/861,347

(22) Filed: Apr. 11, 2013

(65) Prior Publication Data

US 2013/0335786 A1 Dec. 19, 2013

(30) Foreign Application Priority Data

Jun. 13, 2012 (JP) ................................. 2012-134186

(51) Int. Cl.
*H04N 1/04* (2006.01)
*H04N 1/00* (2006.01)
*H04N 1/028* (2006.01)
*H04N 1/10* (2006.01)
*H04N 1/195* (2006.01)

(52) U.S. Cl.
CPC ....... *H04N 1/00519* (2013.01); *H04N 1/02815* (2013.01); *H04N 1/10* (2013.01); *H04N 1/19594* (2013.01); *H04N 2201/02497* (2013.01); *H04N 2201/0436* (2013.01)
USPC ............ 358/474; 358/475; 358/494; 358/497

(58) Field of Classification Search
CPC ... H04N 1/193; H04N 1/1017; H04N 1/1013; H04N 2201/1016; H04N 2201/0425
USPC .................. 358/474, 497, 475, 505, 509, 494
See application file for complete search history.

(56) References Cited

U.S. PATENT DOCUMENTS

| | | | | |
|---|---|---|---|---|
| 5,172,144 A | * | 12/1992 | Hetrick | 353/97 |
| 5,995,245 A | * | 11/1999 | Moro | 358/474 |
| 6,771,394 B1 | | 8/2004 | Nakanishi et al. | |
| 7,218,426 B2 | * | 5/2007 | Sugano | 358/475 |
| 8,130,248 B2 | * | 3/2012 | Hyun et al. | 347/134 |
| 2007/0002395 A1 | * | 1/2007 | Seo | 358/474 |
| 2011/0286052 A1 | * | 11/2011 | Takabatake | 358/475 |
| 2011/0299135 A1 | * | 12/2011 | Takabatake | 358/474 |
| 2012/0314263 A1 | * | 12/2012 | Kawata | 358/474 |
| 2012/0314264 A1 | * | 12/2012 | Kimura | 358/474 |
| 2012/0320430 A1 | * | 12/2012 | Murata et al. | 358/474 |
| 2012/0320432 A1 | * | 12/2012 | Kimura | 358/474 |
| 2012/0320434 A1 | * | 12/2012 | Takeda | 358/475 |
| 2012/0320437 A1 | * | 12/2012 | Kanaya | 358/518 |
| 2013/0155473 A1 | * | 6/2013 | Higashi | 358/463 |
| 2013/0335787 A1 | * | 12/2013 | Kawata | 358/474 |
| 2013/0335789 A1 | * | 12/2013 | Kimura | 358/475 |

FOREIGN PATENT DOCUMENTS

JP 2001-028671 A 1/2001

* cited by examiner

*Primary Examiner* — Cheukfan Lee
(74) *Attorney, Agent, or Firm* — McDermott Will & Emery LLP

(57) ABSTRACT

An overhead image reading apparatus 1 includes: an image-capturing unit 22 that captures an image of a medium S to be read from above when the medium S to be read is placed on a placement surface 2; a light source 21 that irradiates the medium S to be read with light when the image-capturing unit 22 captures the image of the medium S to be read; and a light blocking portion 25 that blocks light above an upper-end position of light emitted from the light source 21. As a result, the user 100 can be prevented from seeing light from the light source 21 with his/her eyes and from being dazzled with an unpleasant feeling by light from the light source 21 during reading on the medium S to be read.

7 Claims, 15 Drawing Sheets

OVERHEAD IMAGE READING APPARATUS

CROSS-REFERENCE TO RELATED APPLICATIONS

This application is based upon and claims the benefit of priority from Japanese Patent Application No. 2012-134186, filed on Jun. 13, 2012, the entire contents of which are incorporated herein by reference.

BACKGROUND OF THE INVENTION

1. Field of the Invention

The present invention relates to an overhead image reading apparatus.

2. Description of the Related Art

An overhead image reading apparatus that reads a medium to be read from above in the vertical direction has been known in related art. With such an overhead image reading apparatus, the distance between a light source and a surface of the original is long, which requires a high light intensity or brightness enough to read an image. For this reason, some overhead image reading apparatuses in the related art prevent the user from being dazzled by the irradiation light having a high intensity. For example, Japanese Patent Application Laid-open No. 2001-28671 discloses an image reading apparatus using a light beam like one emitted through a slit, hereinafter referred to as a slit-light beam, as light to irradiate the original to reduce the dazzle by irradiating a surface of the original with the slit-light beam.

However, with an apparatus such as an overhead image reading apparatus having the light source, the user can see the light source with his/her eyes when the light source is arranged in the line of sight of the user using the apparatus. In this case, the user may feel uncomfortable because light from the light source directly gets in the user's eyes.

SUMMARY OF THE INVENTION

It is an object of the present invention to at least partially solve the problems in the conventional technology.

According to an aspect of the present invention, an overhead image reading apparatus includes an image-capturing unit that captures an image of a medium to be read from above when the medium to be read is placed on a placement surface, a light source that irradiates the medium to be read with light when the image-capturing unit captures the image of the medium to be read, and a light blocking member that blocks light above an upper-end position of light emitted from the light source.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an overhead image reading apparatus according to the present invention will be described in detail below with reference to the drawings. Note that the invention is not limited to these embodiments. Furthermore, components in the embodiments below include those that can be easily replaced with by a person skilled in the art or those that are substantially the same thereto.

First Embodiment

Figure 1:
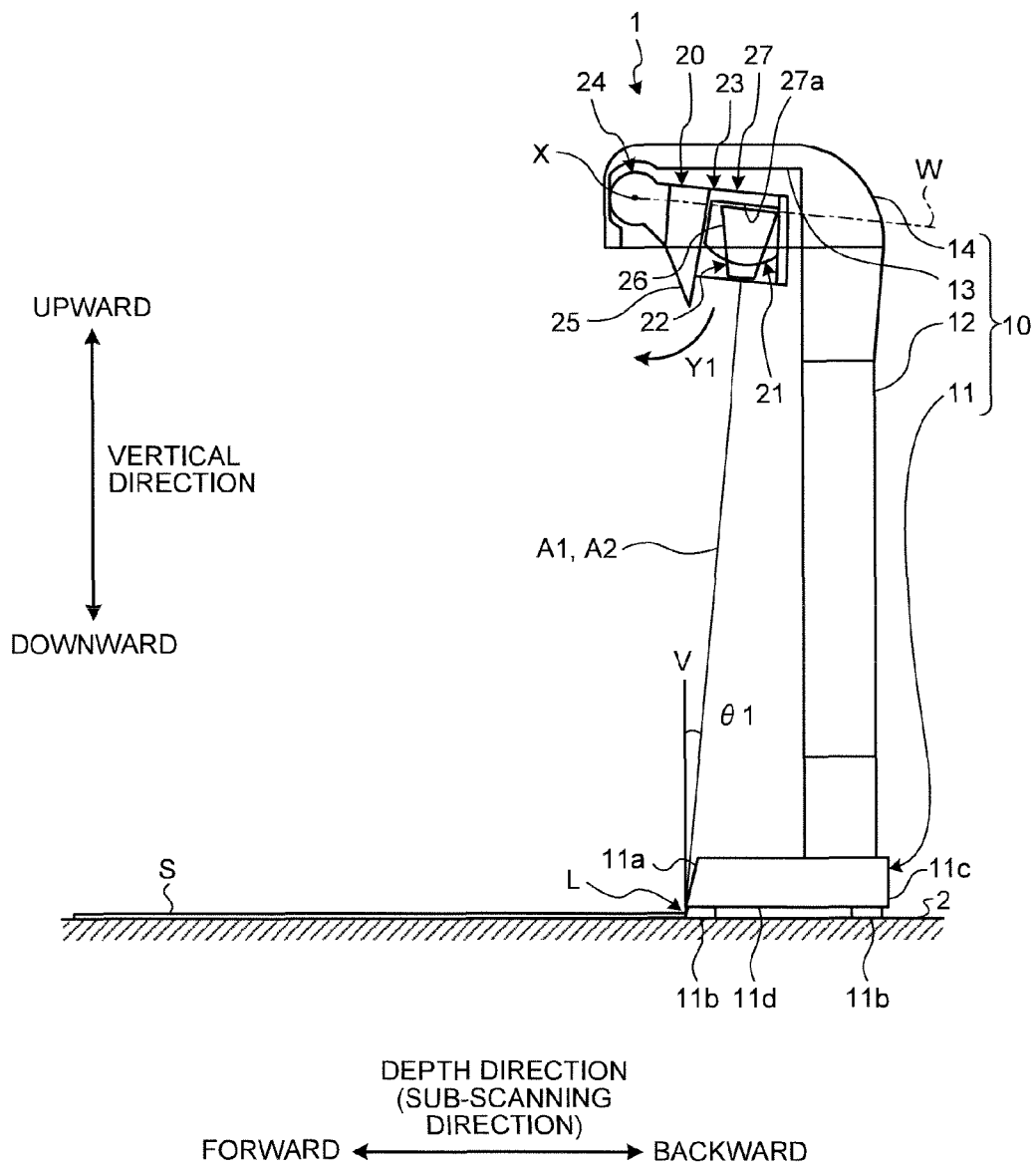
FIG. 1 is a side view of an overhead image reading apparatus according to a first embodiment.
Figure 2:
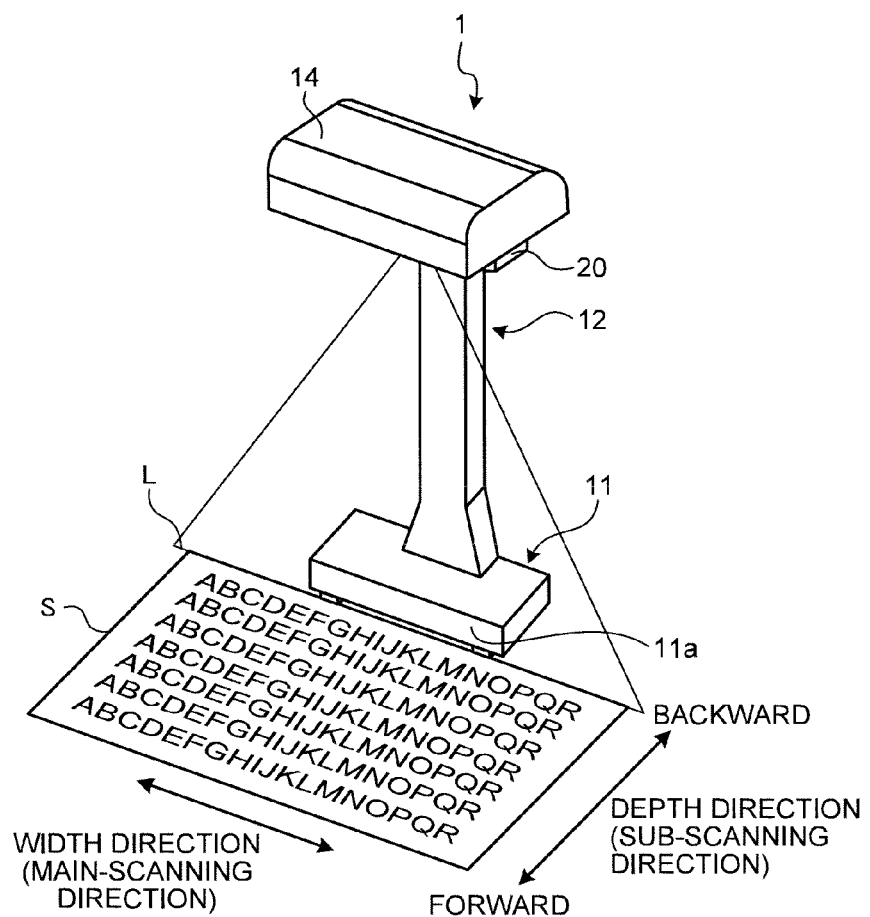
FIG. 2 is a perspective view of the overhead image reading apparatus according to the first embodiment.

FIG. 1 is a side view of an overhead image reading apparatus 1 according to a first embodiment. FIG. 2 is a perspective view of the overhead image reading apparatus 1 according to the first embodiment. The overhead image reading apparatus 1 illustrated in FIGS. 1 and 2 is an image reading apparatus that reads a medium S to be read from above in the vertical direction. The overhead image reading apparatus 1 includes a body 10 and an optical unit 20, and is capable of reading an image on the medium S to be read placed on a placement surface 2 below, in the vertical direction, the optical unit 20. The placement surface 2 is, for example, a flat surface such as a top surface of a desk.

The body 10 includes a pedestal 11, an arm 12, a holder 13 and a cover 14. The pedestal 11 is placed on the placement surface 2 or the like and supports the entire body 10, serving as a base of the body 10. Operating switches of the overhead image reading apparatus 1 such as a power switch and a switch for starting image reading are provided on the pedestal 11, for example. The pedestal 11 has a flat shape, for example, and is installed in a manner that a bottom surface 11d thereof and the placement surface 2 face each other. The bottom surface 11d of the pedestal 11 is provided with legs 11b. The legs 11b are positioned at four corners of the bottom surface 11d of the pedestal 11 to support the pedestal 11.

The pedestal 11 in the present embodiment has a shape of a flat rectangular parallelepiped or the like, in which the length in the vertical direction is shorter than both of the length in the width direction (a main-scanning direction, which is described later) and the length in the depth direction (a sub-scanning direction, which is described later). In addition, the length in the width direction of the pedestal 11 is longer than that in the depth direction thereof.

The medium S to be read is placed in a manner that one side of the medium S to be read is butted against a front surface 11a that is one of four side surfaces of the pedestal 11. For example, the medium S to be read is placed in a manner that the medium S to be read is butted against two legs 11b positioned on the side of the front surface 11a. Thus, the medium S to be read is placed on the placement surface 2 so that one side thereof is parallel to the front surface 11a. In the overhead image reading apparatus 1 according to the first embodiment, with respect to the medium S, when the medium S to be read has a rectangular shape and is placed in a manner that one of the sides thereof is butted against the front surface 11a, the direction parallel to one side of the front surface 11a is defined as the "width direction" or the "main-scanning direction". On the other hand, with respect to the medium S, the direction parallel to a side perpendicular to the side which is butted against the front surface 11a is defined as the "depth direction" or the "sub-scanning direction". In other words, the depth direction is a direction in which the user and the overhead image reading apparatus 1 face each other when the user is opposed to the overhead image reading apparatus 1 with the medium S to be read therebetween, namely, when the user faces the overhead image reading apparatus over the medium S to be read. In the depth direction, the direction from a back surface 11c toward the front surface 11a is referred to as forward direction and the direction from the front surface 11a toward the back surface 11c is referred to as backward direction. Note that the back surface 11c is one of the four side surfaces of the pedestal 11 that is opposed to the front surface 11a in the depth direction.

The arm 12 is connected to the pedestal 11 and extends upward in the vertical direction from the pedestal 11. The arm 12 is formed into a pillar or a pipe both having, for example, a rectangular cross section. The arm 12 has slopes at lower portion thereof where cross-section of the arm 12 gradually increases as it extends downward (toward the lower side) in the vertical direction. More specifically, the length in the width direction of the lower portion of the arm 12 increases as the arm 12 extends toward the lower side in the vertical direction. The arm 12 is connected to an upper surface of the pedestal 11 at one of sides of the upper surface. Specifically, the arm 12 is connected to the upper surface of the pedestal 11 at a side opposite to a side where the medium S to be read is placed, out of four sides forming edges of the upper surface. In other words, the arm 12 is connected to an end of the pedestal 11 which is adjacent to the back surface 11c that is remote from the medium S to be read. The arm 12 is connected to a central portion of the pedestal 11 in the width direction.

The holder 13 is connected to the arm 12 at an upper end thereof in the vertical direction. The holder 13 protrudes forward in the sub-scanning direction from the upper end of the arm 12. The holder 13 protrudes toward both sides in the width direction from the upper end of the arm 12. That is, the holder 13 protrudes from the arm 12 toward a placement side which is a side to face the placement surface 2 on which the medium S to be read is placed (also referred to as a medium S side) and toward both sides in the width direction.

The pedestal 11 and the holder 13 face each other in the vertical direction. An end of the pedestal 11 located on a side opposite to the medium S side in the length direction, and an end of the holder 13 on the side opposite to the medium S side in the length direction are connected with the arm 12. The holder 13 protrudes forward in the length direction beyond the pedestal 11. That is, a front edge of the holder 13 is located more forward than a front edge of the pedestal 11. As a result, at least a part of the holder 13 and the medium S to be read face each other in the vertical direction when the medium S is placed on the placement surface 2 so as to abut on the pedestal 11.

The cover 14 covers at least the rotation axis X of the optical unit 20 and covers the holder 13 and the optical unit 20. The cover 14 covers the rotation axis X, the holder 13 and the optical unit 20 from above in the vertical direction, and serves as an outer shell of the upper part of the body 10 including the holder 13 and the optical unit 20. Note that the cover 14 and the holder 13 may be formed integrally. Specifically, the optical unit 20 may be supported by the cover 14 rotatably about the rotation axis X relative to the body 10.

In the description of the overhead image reading apparatus 1 according to the first embodiment, the "radial direction" refers to the radial direction perpendicular to the rotation axis X unless otherwise stated, and "viewed in the axial direction" herein refers to "viewed in the axial direction of the rotation axis X" unless otherwise stated.

The optical unit 20 is a rotation unit that can rotate about the rotation axis X relative to the body 10. The rotation axis X extends horizontally in the width direction, that is, in the direction parallel to the front surface 11a. The optical unit 20 includes a light source 21, an image-capturing unit 22, a body 23 and a shaft 24. The shaft 24 has a cylindrical shape and is supported rotatably about the rotation axis X by the holder 13 via a bearing or the like. The rotation axis X is positioned forward of the front surface 11a of the pedestal 11. The body 23 of the optical unit 20 is connected to the shaft 24 and extends outward in the radial direction of the rotation axis X from the shaft 24. The body 23 is a hollow member having a rectangular cross-section as viewed in the axial direction, for example. The light source 21 and the image-capturing unit 22 are mounted inside the body 23.

The light-blocking portion 25 is provided to lower the upper-end position of light emitted from the light source 21 and is connected to the body 23. Specifically, the light-blocking portion 25 is positioned opposite to the position of the arm 12 in the vertical scanning direction with respect to the position at which the light source 21 is mounted on the body 23. Specifically, the light-blocking portion 25 is provided between the light source 21 and the user such that the light-blocking portion 25 is positions nearer to the user than the light source 21, when the user faces the overhead image reading apparatus 1 with the medium S to be read therebetween. Thus, the light-blocking portion 25, which is provided between the light source 21 and the user, extends downward from the body 23, and the lower end thereof is positioned below the lower end of the light source 21.

The holder 13 is provided with a drive unit 31 (see FIG. 4) that is a swinging mechanism. The drive unit 31 can make the optical unit 20 rotate and swing about the rotation axis X by applying a drive force about the rotation axis X to the optical unit 20. The drive unit 31 includes, for example, a driving unit such as an electric motor, and a transmission part connecting a rotary shaft of the motor and the optical unit 20. The motor is a stepping motor, for example, and can accurately control the rotation angle of the optical unit 20. The transmission part is made of a combination of pulleys, belts, worm gears and the like, for example. The rotation of the motor is decelerated by the transmission part and transmitted to the optical unit 20. The optical unit 20 which is rotated by the drive force from the drive unit 31 is rotatably provided in this manner. The light-blocking portion 25, which is connected to the body 23 of the optical unit 20, is provided in a rotating direction of the light source 21 of the optical unit 20 shown by an arrow Y1.

Figure 3:
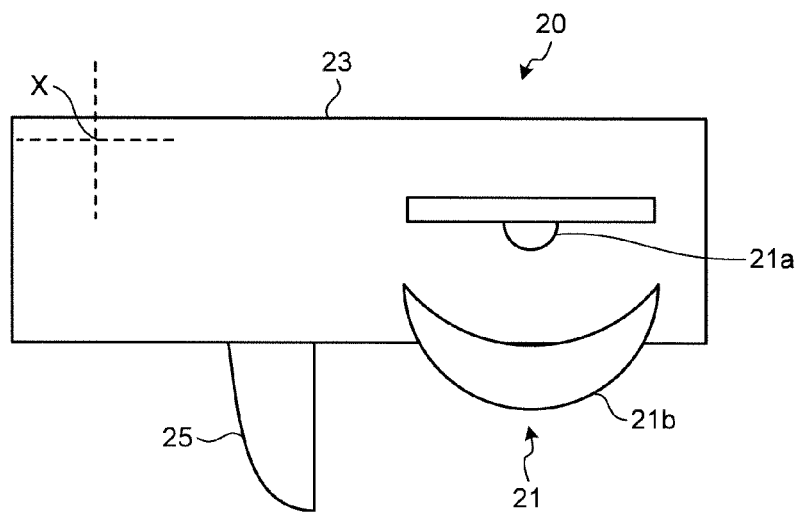
FIG. 3 is an explanatory diagram illustrating components of a light source.

FIG. 3 is a detailed view of the light source which illustrates components of the light source. The light source 21 includes a light emitting portion 21a such as a light emitting diode (LED), and can emit light toward the medium S to be read from above in the vertical direction. The light source 21 has a function of irradiating the medium S to be read with slit-light beam, and includes a lens 21b that is arranged below the light emitting portion 21a and capable of emitting slit-light beam, for example. The light source 21 may include a plurality of lighting modules each having the light emitting portion 21a and the lens 21b. For example, the lighting modules may be arranged on both sides of the horizontal scanning direction with the image-capturing unit 22 therebetween.

The lens 21b arranged below the light emitting portion 21a is made of a transparent material having a curved surface which is convex downward and placed convex side down. When light from the light emitting portion 21a arranged above the lens 21b passes through the lens 21b, the lens 21b changes the light into a strip of light, by changing the direction of the light, as if the light is emitted through a slit, i.e. the slit-light beam, that is narrow in the vertical scanning direction and wide in the horizontal scanning direction and emits the light toward the medium S to be read.

The light source 21 and the image-capturing unit 22 are arranged to overlap each other as viewed in the axial direction. More specifically, the optical axis A1 of the light source 21 and the optical axis A2 of the image-capturing unit 22 overlap each other as viewed in the axial direction. In other words, the optical axis A1 and the optical axis A2 are arranged coaxially. Furthermore, the light source 21 and the image-capturing unit 22 are arranged on one virtual line W extending outward in the radial direction from the rotation axis X. For example, when a straight line connecting the rotation axis X and a light receiving surface 27a (which will be described later) of a CCD 27, is drawn as the virtual line W, the light source 21 is arranged on the virtual line W.

The image-capturing unit 22 is an image sensor having a charge coupled device (CCD), for example, and can capture an image of the medium S to be read placed on the placement surface 2 below the optical unit 20 in the vertical direction, from above. Specifically, the image-capturing unit 22 can convert light, which is reflected by an image to be read on a reading target line L and entering the image-capturing unit 22, into electronic data by photoelectric conversion to generate image data of the read image. The image-capturing unit 22 includes a reading lens 26 and the CCD 27. The CCD 27 is a line sensor in which a plurality of pixels for reading images is arranged in array in the horizontal scanning direction. The CCD 27 is arranged in the optical unit 20 in a state in which the horizontal scanning direction thereof is parallel to the rotation axis X. The reading lens 26 focuses the reflected light from the medium S to be read onto the light receiving surface 27a of the CCD 27. The pixels of the CCD 27 receive the light from the read image focused on the light receiving surface 27a by the reading lens 26, and output electric signals corresponding to the received light. The CCD 27 can read an image on the reading target line L of the medium S to be read and generate line image data in the horizontal scanning direction. The number of lines of the CCD 27 may be one or more than one.

The light source 21 is arranged in a manner capable of irradiating the medium S to be read with light during capturing image by the image-capturing unit 22, and irradiates an image on the reading target line L of the medium S to be read, that is, the image to be read with light. The light source 21 is adjusted so that the irradiation light spreads at a predetermined angle with respect to the optical axis A1. This angle is determined so that the width in the sub-scanning direction of the irradiation light on the medium S to be read becomes a predetermined value. The light source 21 is also adjusted so that the irradiation light spreads in the main-scanning direction and the medium S to be read can be irradiated therewith from one end to the other thereof.

Figure 4:
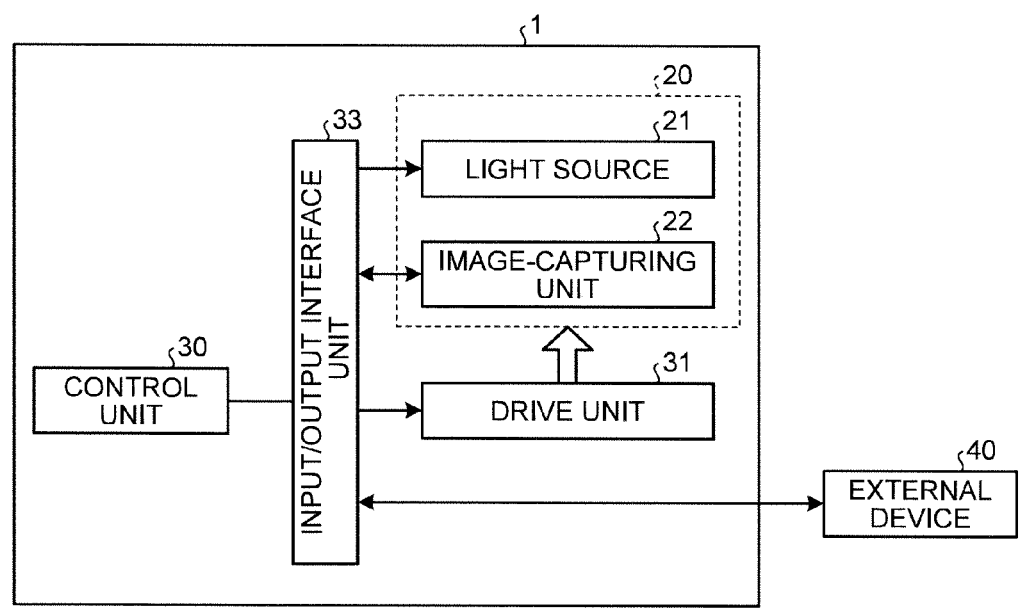
FIG. 4 is a block diagram illustrating a configuration of a main part of the overhead image reading apparatus according to the first embodiment.

FIG. 4 is a block diagram illustrating a configuration of a main part of the overhead image reading apparatus 1 according to the first embodiment. The overhead image reading apparatus 1 according to the first embodiment includes a control unit 30, which is an electronic controller including a computer system, for example. The control unit 30 has functions of controlling the light source 21, the image-capturing unit 22 and the drive unit 31 when reading an image. The control unit 30 is connected to the light source 21, the image-capturing unit 22 and the drive unit 31 via an input/output interface unit 33. The control unit 30 can also be connected to an external device 40 such as a personal computer (PC) and an information terminal via the input/output interface unit 33. The overhead image reading apparatus 1 can be controlled by the external device 40 and has a function of reading the medium S to be read and a function of outputting read image data of the medium S to the external device 40 in response to a reading instruction from the external device 40.

The control unit 30 controls turning on and off of the light source 21 by adjusting power supply to the light source 21. The control unit 30 may also have a function of controlling the light emission amount of the light source 21. When reading of an image is performed by the image-capturing unit 22, the control unit 30 turns on the light source 21 to irradiate the reading target line L with light. The control unit 30 can also drive the image-capturing unit 22 to make the image-capturing unit 22 read the medium S to be read and obtain image data generated by the image-capturing unit 22.

The control unit 30 can control the drive unit 31 to make the optical unit 20 swing about the rotation axis X. The control unit 30 can also adjust a rotational position to which the optical unit 20 is rotated about the rotation axis X so that the reading target line L is set to a certain position on the medium S to be read in the vertical scanning direction and read a line image therefrom.

The overhead image reading apparatus 1 can obtain image data of the entire medium S to be read by repeating obtaining line image data and adjusting the position of the reading target line L by rotating the optical unit 20. In other words, with the overhead image reading apparatus 1, the irradiation light from the light source 21 scans the surface of an original in the sub-scanning direction and the image-capturing unit 22 reads images on the reading target lines L irradiated with light, as a result of which an image of the medium S to be read can be generated. The overhead image reading apparatus 1 can read line images on the respective reading target lines L while sequentially moving the position of the reading target line L forward from the back in the depth direction, for example, to generate two-dimensional image data of the medium S to be read.

With the overhead image reading apparatus 1 according to the first embodiment, the image-capturing unit 22 rotates with the optical unit 20 and scans and captures images of the medium S to be read while rotating about the rotation axis X on a circumference around the rotation axis X as the center thereof. As a result, fluctuation in the length of a light path between the image-capturing unit 22 and the reading target line L, which is at the reading target position, is prevented.

The overhead image reading apparatus 1 according to the first embodiment has such a configuration as described above, and the operation thereof will be described below. FIG. 1 illustrates the optical unit 20 at a position to which the optical unit 20 is rotated (hereinafter rotational position) to read the image at the backmost area in a readable range. Hereinafter, this rotational position of the optical unit 20 will also be referred to as the "furthest reading position" in the description. The optical unit 20 at the furthest reading position can read the side, which is butted against the front end of the pedestal 11, of the medium S to be read. The furthest reading position is a rotational position at which the optical unit 20 starts reading the image.

At the furthest reading position, the body 23 of the optical unit 20 is positioned backward of the shaft 24. The optical unit 20 at the furthest reading position extends in a substantially horizontal direction from the rotation axis X, and more specifically, the body 23 of the optical unit 20 is slightly tilted downward in the vertical direction with increasing distance in the radial direction from the rotation axis X. In other words, the body 23 of the optical unit 20 at the furthest reading position is tilted in a manner that an outer portion in the radial direction is positioned backward in the sub-scanning direction and downward in the vertical direction of an inner portion.

Furthermore, the furthest reading position is also a standby position of the optical unit 20, which is a rotational position of the optical unit 20 when the image-capturing unit 22 does not perform reading of the medium S to be read. Thus, the optical unit 20 is positioned at the furthest reading position when reading of an image is not performed and waits until an instruction to start reading an image is provided. Note that the standby position may be a position other than the furthest reading position. For example, the standby position may be a position in which the body 23 is positioned upward in the vertical direction of the furthest reading position, in other words, a position to which the optical unit 20 is rotated in the direction opposite to a feeding direction indicated by an arrow Y1 from the furthest reading position.

When the optical unit 20 is at a position where reading of the medium S to be read is started, the light source 21 and the image-capturing unit 22 face the placement surface 2 in the respective optical axis directions. In other words, the light source 21 and the image-capturing unit 22 at in a state in which the optical unit 20 is at the furthest reading position are in states capable of irradiating the placement surface 2 and capable of reading an image on the placement surface 2, respectively. Specifically, the optical axis A1 of the light source 21 and the optical axis A2 of the image-capturing unit 22 of the optical unit 20 at the furthest reading position do not intersect with the rotation axis X but are both away from the rotation axis X as viewed in the axial direction. Thus, when the optical unit 20 is at the furthest reading position, the optical axes A1 and A2 are both tilted forward as they approach downward in the vertical direction.

When reading of the medium S to be read is started from the furthest reading position, the drive unit 31 rotates the optical unit 20 in the feeding direction Y1. In other words, the drive unit 31 rotates the optical unit 20 so that the body 23 of the optical unit 20 moves downward in the vertical direction and also moves forward. The rotating direction is a direction in which the optical unit 20 is caused to swing about the rotation axis X toward the side on which the medium S to be read is placed, and is also a direction in which the optical unit 20 is caused to swing about the rotation axis X closer to the placement surface 2.

Figure 5:
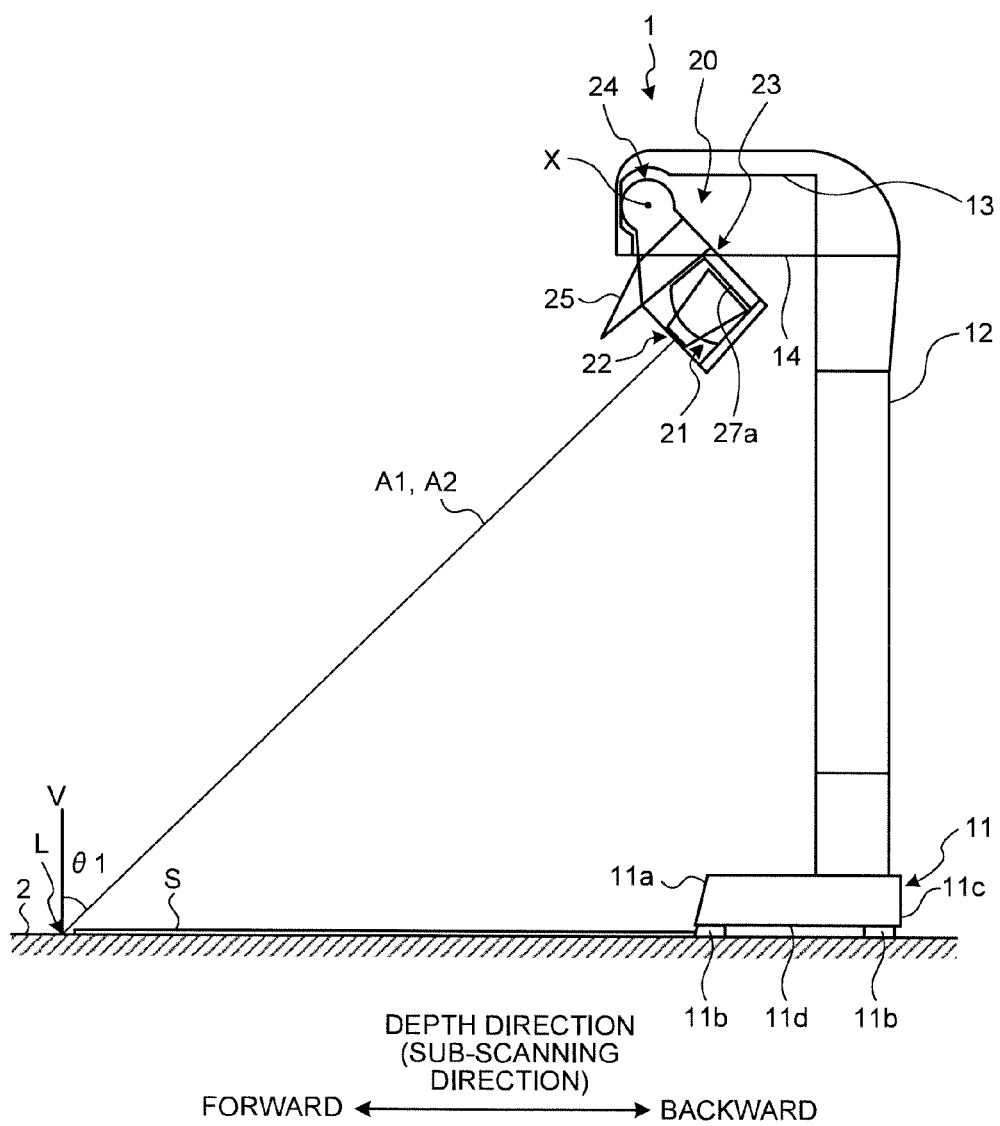
FIG. 5 is an explanatory diagram illustrating a state of the overhead image reading apparatus illustrated in FIG. 1 where a reading target position is moved forward.

FIG. 5 is an explanatory diagram illustrating a state in which the reading target position is moved forward in the overhead image reading apparatus illustrated in FIG. 1. As a result of swinging the optical unit 20 in the feeding direction Y1 by the drive unit 31 for reading the medium S to be read, the reading target position by the image-capturing unit 22 moves forward and the medium S to be read can be sequentially read from the back to the front. As a result of rotating the optical unit 20, the tilt angle θ1 of the optical axis A2 of the image-capturing unit 22 with respect to the vertical axis V increases, and the distance in the sub-scanning direction between the image-capturing unit 22 and the reading target line L increases. Accordingly, the component in the sub-scanning direction of the length of the light path increases. Meanwhile, since the image-capturing unit 22 moves downward in the vertical direction as a result of rotating the optical unit 20 about the rotation axis X, the distance in the vertical direction between the image-capturing unit 22 and the reading target line L decreases, Accordingly, the component in the vertical direction of the length of the light path decreases. Since the component in the sub-scanning direction increases while the component in the vertical direction of the length of the light path decreases with rotation of the optical unit 20 as described above, the fluctuation in the length of the light path during scanning of the medium S to be read is prevented.

The optical unit 20 that swings during reading of the medium S to be read comes to a rotational position at which the furthest forward position in a readable range can be imaged by swinging in the direction in which the reading target position by the image-capturing unit 22 moves forward. Hereinafter, this rotational position of the optical unit 20 will also be referred to as the "nearest reading position". At the nearest reading position, the body 23 of the optical unit 20 is positioned below, in the vertical direction, the shaft 24. The body 23 of the optical unit 20 at the nearest reading position is tilted in a manner that an outer portion in the radial direction is positioned backward of an inner portion in the sub-scanning direction, and downward of the inner portion in the vertical direction. The image-capturing unit 22 and the light source 21 in this state are positioned backward of the rotation axis X. The optical axis A2 of the image-capturing unit 22 is tilted forward and downward in the vertical direction. In this state, the tilt angle θ1 of the optical axis A2 with respect to the vertical axis is larger than the tilt angle θ1 at the furthest reading position (see FIG. 1).

With the overhead image reading apparatus 1 according to the first embodiment, as the optical unit 20 rotates from the furthest reading position to the nearest reading position, the component in the vertical direction of the length of the light path continues to decrease while the component in the sub-scanning direction of the length of the light path continues to increase with rotation. Thus, the component in the vertical direction and the component in the sub-scanning direction of the length of the light path always continue to increase or decrease in an opposite manner. As a result, the difference between a maximum value and a minimum value of the length of the light path between the image-capturing unit 22 and the medium S to be read is reduced. For example, in an example in which the position in height of the image-capturing unit 22 is 350 mm and an A3 size medium S is to be read, if the image-capturing unit 22 is arranged on the rotation axis X and reading is performed in a different manner from that of the overhead image reading apparatus 1 according to the first embodiment, i.e. in a manner in which the position in the vertical direction of the image-capturing unit 22 is not changed, the maximum value of the length of the light path is 510 mm, the minimum value thereof is 350 mm and the difference in the length of the optical path is 160 mm. On the other hand, when the image-capturing unit 22 is arranged in the body 23 of the pendulum-type optical unit 20 as in the overhead image reading apparatus 1 according to the first embodiment, the maximum value of the length of the optical path can be suppressed to about 450 mm, in which case the difference in the length of the optical path is reduced to about 100 mm.

Accordingly, with the overhead image reading apparatus 1 according to the first embodiment, the depth of field can be reduced without making the position of the optical unit 20 higher. Note that the position in height of the optical unit 20, the position in the radial direction of the image-capturing unit 22 in the optical unit 20, and the angle at which the optical axis A2 intersects with the radial direction W connecting the rotation axis X and the light receiving surface 27a of the CCD 27 can be set to a suitable value. For example, sizes, angles and the like may be set so that the rate or amount of variation in the length of the light path when the optical unit 20 is rotated from the furthest reading position to the nearest reading position on the basis of given conditions becomes as small as possible.

When reading of the medium S to be read is completed, the control unit 30 moves the optical unit 20 to the standby position by the drive unit 31. The optical unit 20 that has moved to the standby position is stored and protected at the storage position inside the cover 14. The drive unit 31 can move the optical unit 20 to an arbitrary position within a swinging range from the standby position to the furthest reading position by making the optical unit 20 rotate/swing about the rotation axis X as described above.

Furthermore, with the overhead image reading apparatus 1 according to the first embodiment, the light source 21 mounted in the optical unit 20 irradiates the medium S to be read with light while rotating about the rotation axis X on a circumference around the rotation axis X as the center thereof with the turning of the optical unit 20. As a result, variation in the length of the optical path between the light source 21 and the reading target line L is suppressed and variation in illuminance depending on the position in the vertical scanning direction is suppressed. Thus, similarly to the image-capturing unit 22, the component in the vertical scanning direction increases while the component in the vertical direction of the length of the light path between the light source 21 and the reading target line L decreases with the rotation of the optical unit 20. As a result, variation in the length of the optical path between the light source 21 and the reading target line L while the light source 21 scans the medium S to be read from the backmost end to the front end is suppressed. Variation in illuminance depending on the position in the vertical scanning direction is therefore suppressed, and the quality of images generated by the overhead image reading apparatus 1 is improved.

Figure 6:
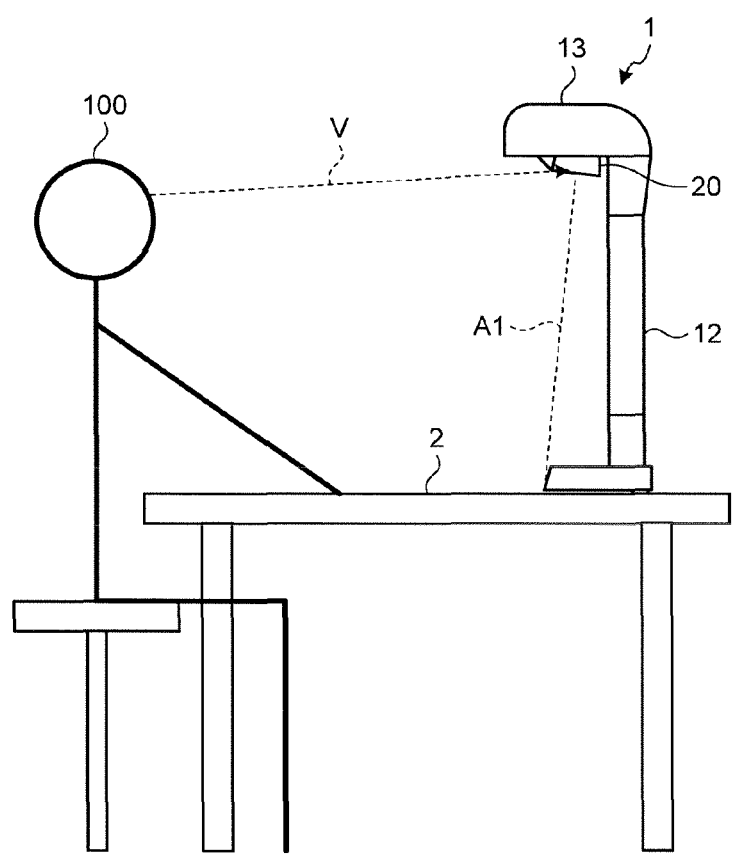
FIG. 6 is an explanatory diagram of a state of the overhead image reading apparatus according to the first embodiment at the time of starting reading a medium to be read.

Next, positional relation between the overhead image reading apparatus 1 and a user 100 when the overhead image reading apparatus 1 reads the medium S to be read will be described. FIG. 6 is an explanatory diagram of a state when the overhead image reading apparatus 1 according to the first embodiment starts reading the medium S to be read. In order to read the medium S to be read using the overhead image reading apparatus 1, the overhead image reading apparatus 1 is placed on the placement surface 2, e.g. a top surface of a desk, and the overhead image reading apparatus 1 performs reading the medium S to be read, in a state where the overhead image reading apparatus 1 faces the user 100 who is in the direction in which the holder 13 protrudes from the arm 12. When the overhead image reading apparatus 1 reads the medium S to be read, the overhead image reading apparatus starts reading from a state in which the optical unit 20 is at a rotational position of the furthest reading position. Thus, the light source 21 irradiates the backmost position in the readable range of the image-capturing unit 22 at the start of reading. At this time, the user can see the optical unit 20 with the user's eyes as shown in arrow V.

Figure 7:
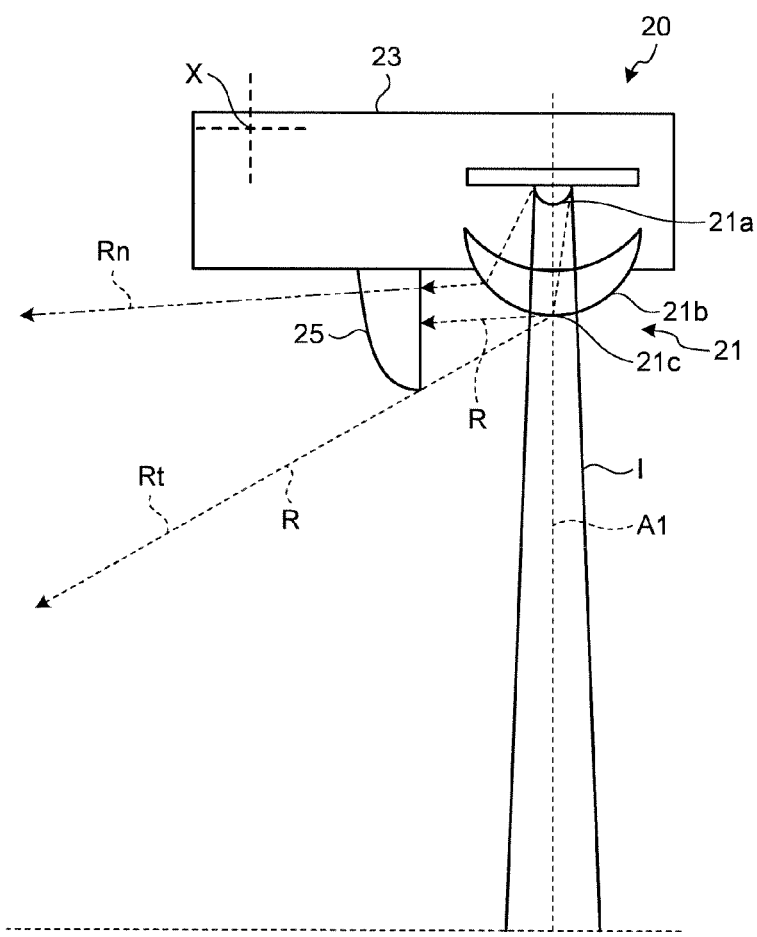
FIG. 7 is an explanatory diagram illustrating a state of a light source irradiating light at the start of reading.

FIG. 7 is an explanatory diagram illustrating a state of the light source 21 irradiating light at the start of reading. When light is emitted by the light source 21, light emitted by the light emitting portion 21a passes through the lens 21b positioned below the light emitting portion 21a, most of the light emitted by the light emitting portion 21a becomes slit-light beam and is emitted toward the placement surface 2 or the medium S to be read as a line-irradiating component I. The line-irradiating component I produced from most of the light emitted by the light emitting portion 21a is emitted along the optical axis A1 of the light source 21.

Meanwhile, part of the light emitted by the light emitting portion 21a is diffused by reflection and the like by the surface and the inner surface of the lens 21b, and emitted outside of the light source 21 as a diffused-component R that is emitted in directions different from that of the optical axis A1 of the light source 21. The diffused-component R is not emitted in a fixed direction and part thereof is emitted forward in the sub-scanning direction, that is, the direction toward the user 100. However, the light-blocking portion 25 is provided on the side of the user 100 with respect to the light source 21. Thus, light emitted toward the user 100 included in the diffused-component R is blocked by the light-blocking portion 25 and does not reach the user 100.

Among the light emitted toward the user 100, the diffused-component R is blocked by the light-blocking portion 25, which lowers an upper-end position Rt that is an upper end of the light emitted toward the user 100 in downward direction. Specifically, as a result of blocking the diffused-component R by the light-blocking portion 25, the upper-end position Rt is lowered down to a position lower than an unblocked-upper-end position Rn, which is an upper end of the light emitted toward the user 100 when the light-blocking portion 25 is not provided and therefore the light is not blocked by the light-blocking portion 25. That is, the upper-end portion Rt of light emitted from the light source 21 is a position on a line connecting an optical-axis center 21c that is a position on a surface of the lens 21b and a lower tip of the light-blocking portion 25. Accordingly, the light-blocking portion 25 blocks light above the upper-end portion Rt of light emitted from the light source 21.

Figure 8:
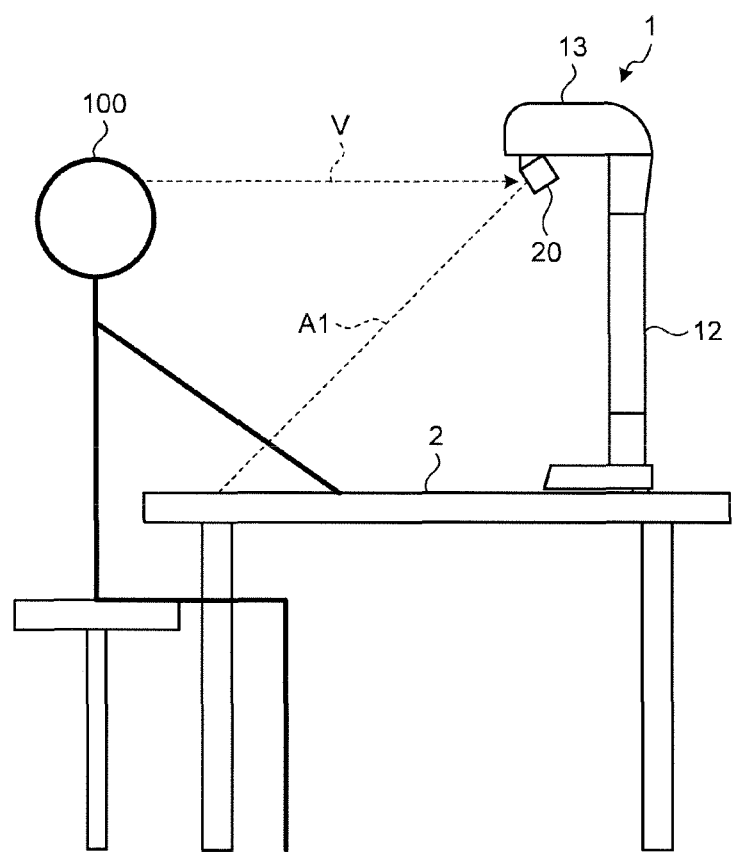
FIG. 8 is an explanatory diagram of a state of the overhead image reading apparatus according to the first embodiment at the time immediately before reading of a medium to be read is completed.

FIG. 8 is a diagram explaining a state immediately before reading of the medium S to be read is completed by the overhead image reading apparatus 1 according to the first embodiment. In the state immediately before reading of the medium S to be read is completed by the overhead image reading apparatus 1, the optical unit 20 is disposed at the rotational position of the nearest reading position, where the light source 21 is in a state irradiating the furthest forward position in the readable range of the image-capturing unit 22. Thus, the direction of the optical axis A1 of the light source 21 is tilted toward the user 100 as compared to that at the start of reading. At this time, the user can see the optical unit 20 with the user's eyes as shown in arrow V.

Figure 9:
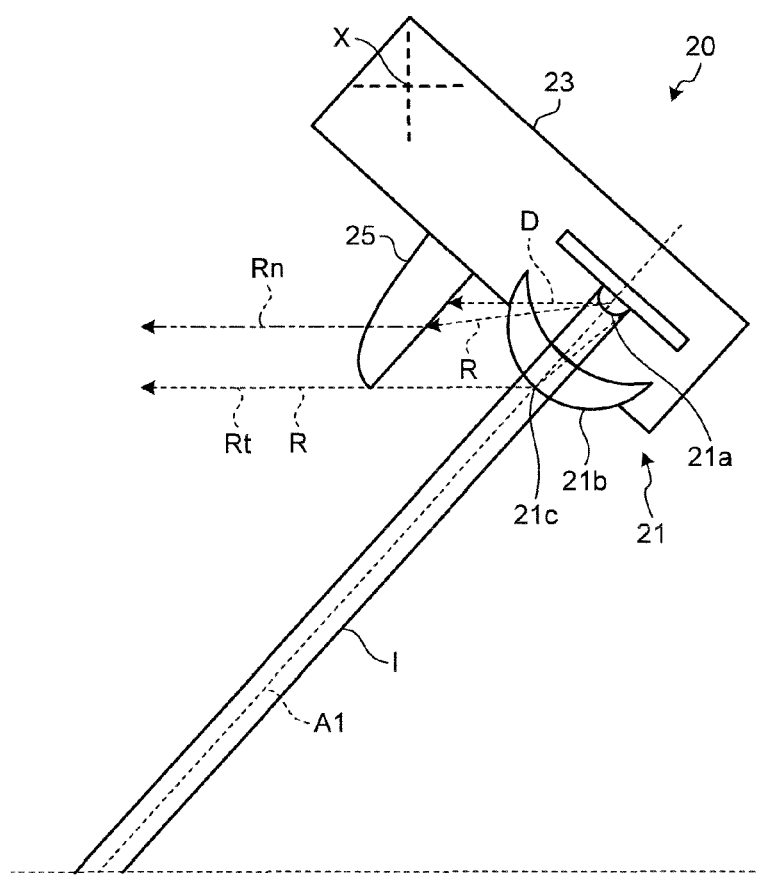
FIG. 9 is an explanatory diagram illustrating a state of the light source irradiating light immediately before reading is completed.

FIG. 9 is an explanatory diagram illustrating a state of the light source 21 irradiating light immediately before reading is completed. In the state immediately before reading is completed by the overhead image reading apparatus 1, since the direction of the optical axis A1 of the light source 21 is tilted toward the user 100, the irradiating direction of the line-irradiating component I is also tilted toward the user 100 as compared to the start of reading.

Furthermore, since the relative positions of the light emitting portion 21a and the lens 21b of the light source 21 do not change even when the optical unit 20 is rotated during reading of the medium S to be read, the diffused-component R also comes closer to the user 100 similarly to the line-irradiating component I. At this point, not only the diffused-component R comes closer to the user 100, but also the upper-end position Rt of the diffused-component R moves upward with the rotation of the optical unit 20 about the rotation axis X. However, this upper-end position Rt is lower than the unblocked-upper-end position Rn. Specifically, the light-blocking portion 25 is provided forward of the light source 21 in the direction in which the optical unit 20 rotates during capturing image by the image-capturing unit 22, that is, forward in the direction in which the light source 21 rotates. Therefore, the light-blocking portion 25 serves to lower the upper-end position Rt of light emitted from the light source 21 during capturing image by the image-capturing unit 22.

As described above, the upper-end position Rt of light emitted from the light source 21 that is lowered by the light-blocking portion 25 is at a height equal to or lower than a level of the light source 21, that is, equal to or lower than the height in the vertical direction of the light source 21 when the optical unit 20 is at a rotational position of the nearest reading position. Specifically, the upper-end position Rt is equal to or lower than a level of the optical-axis center 21c that is the position on the surface of the lens 21b at which the optical axis Al passes through the lens 21b.

Thus, the optical axis A1 of the light source 21 is an axis along a straight line connecting the light emitting portion 21a and the optical-axis center 21c of the lens 21b. The upper-end position Rt, when the optical unit 20 is at the rotational position of the nearest reading position, is at a height equal to or lower than the height in the vertical direction of the optical-axis center 21c of the lens 21b in this state. In other words, the light-blocking portion 25 extends downward from the body 23 of the optical unit 20 at a height at which the upper-end position Rt of light emitted from the light source 21 can be equal to or lower than the level of the optical-axis center 21c of the lens 21b.

When light is emitted by the light emitting portion 21a, part of the light from the light emitting portion 21a passes through the lens 21b without being diffused by the lens 21b and is emitted around the light source 21 as a direct-light component D. Since light toward the user 100 included in the direct-light component D is also blocked by the light-blocking portion 25, the upper-end position Rt of the light from the light source 21 including the direct-light component D is also lowered downward.

Since the upper-end position Rt of the emitted light from the light source 21 is lowered by the light-blocking portion 25, the light from the light source 21 is less likely to get in the eyes of the user 100 even when the optical unit 20 comes to the rotational position of the nearest reading position during reading of the medium S to be read.

With the overhead image reading apparatus 1 according to the first embodiment as described above, since the light-blocking portion 25 for lowering the upper-end position Rt of light emitted from the light source 21 is formed in the optical unit 20, it is possible to prevent the user 100 from seeing the light from the light source 21 with the user's eyes during reading of the medium S to be read. As a result, it is possible to prevent the user 100 from being dazzled with an unpleasant feeling by the light from the light source 21.

Furthermore, the light-blocking portion 25 is provided forward in the direction in which the light source 21 rotates by the drive force from the drive unit 31, and therefore can lower the upper-end position Rt of light emitted from the light source 21 during capturing image by the image-capturing unit 22. It is therefore possible to more reliably prevent the user 100 from seeing light from the light source 21 with the user's eyes while the image-capturing unit 22 and the light source 21 rotate to read the medium S to be read. As a result, it is possible to prevent the user 100 from being dazzled with an unpleasant feeling during reading of the medium S to be read.

Furthermore, the light-blocking portion 25 can lower the upper-end position Rt of light emitted from the light source 21 to a position equal to or lower than the level of the light source 21, and more specifically, to a position equal to or lower than the level of the optical-axis center 21c of the lens 21b. It is therefore possible to more reliably prevent the user 100 from seeing light from the light source 21 with the user's eyes during reading of the medium S to be read. As a result, it is possible to more reliably prevent the user 100 from being dazzled with an unpleasant feeling during reading of the medium S to be read.

Second Embodiment

An overhead image reading apparatus 1 according to the second embodiment has substantially the same configuration as the overhead image reading apparatus 1 according to the first embodiment, except that the light-blocking portion is movable. Since the other components are the same as those in the first embodiment, the description thereof will not be repeated and the same components will be designated by the same reference numerals.

Figure 10:
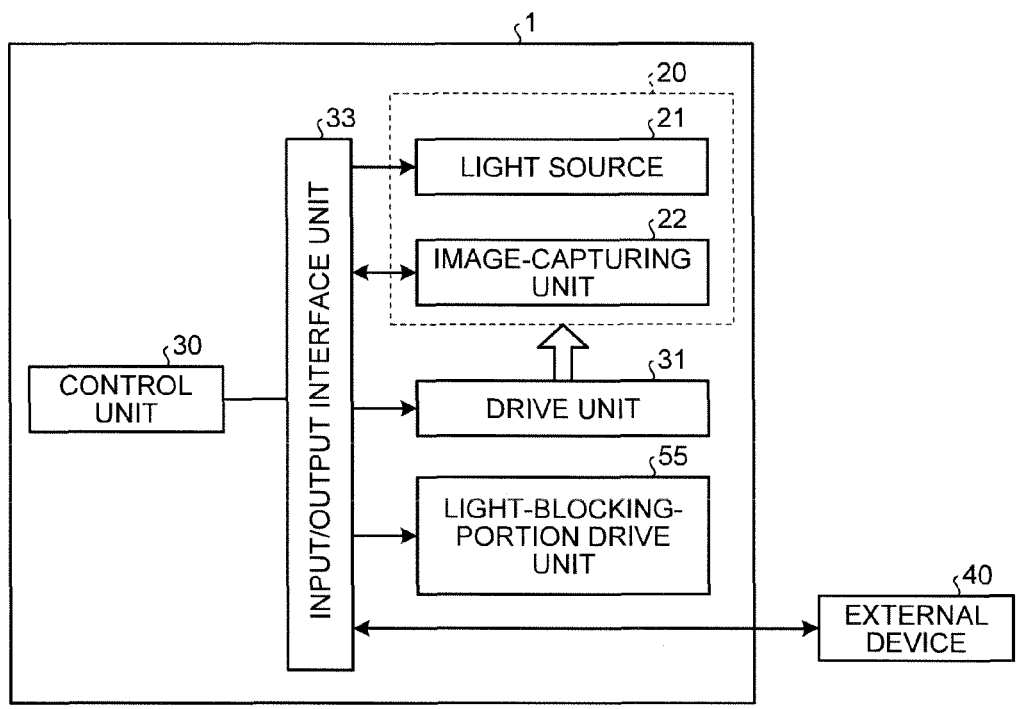
FIG. 10 is a block diagram illustrating a configuration of a main part of an overhead image reading apparatus according to a second embodiment.
Figure 11:
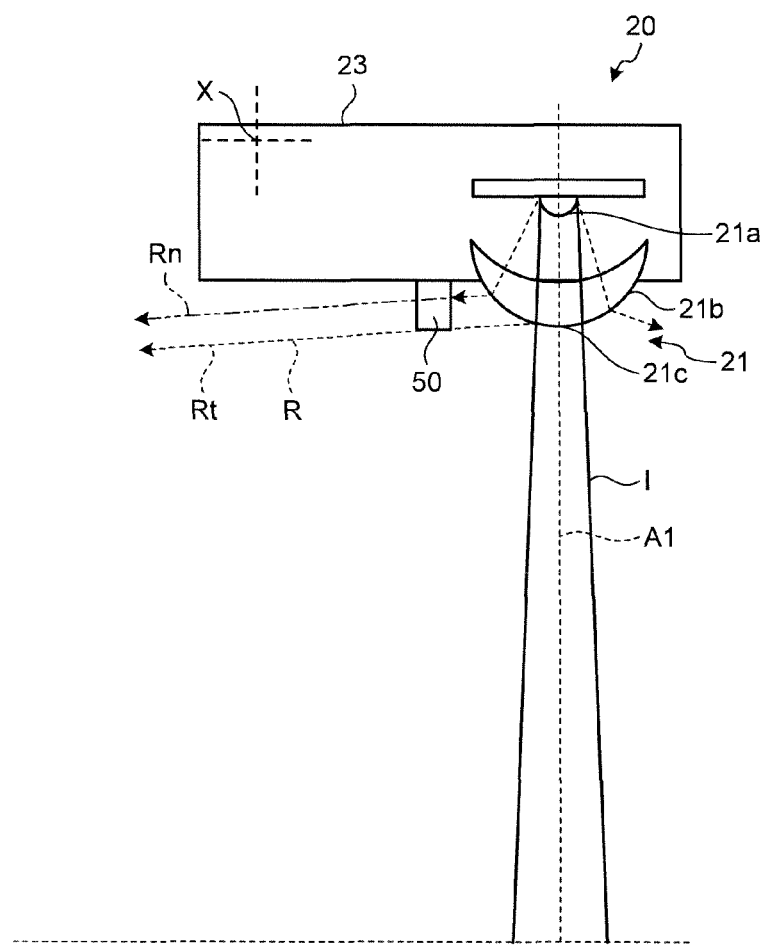
FIG. 11 is an explanatory diagram illustrating components of a light source and a light-blocking portion of the overhead image reading apparatus according to the second embodiment.

FIG. 10 is a block diagram illustrating a configuration of a main part of the overhead image reading apparatus 1 according to the second embodiment. FIG. 11 is a detailed view illustrating components of the light source 21 and the light-blocking portion 50 of the overhead image reading apparatus 1 according to the second embodiment.

The overhead image reading apparatus 1 according to the second embodiment includes the control unit 30 similarly to the overhead image reading apparatus 1 according to the first embodiment, and can control the light source 21, the image-capturing unit 22 and the drive unit 31 by the control unit 30 via the input/output interface unit 33. With this configuration, the overhead image reading apparatus 1 can read the medium S to be read while rotating the optical unit 20.

Furthermore, the overhead image reading apparatus 1 according to the second embodiment includes a light-blocking portion 50 that lowers the upper-end position of light emitted from the light source 21 similarly to the overhead image reading apparatus 1 according to the first embodiment. The light-blocking portion 50 is provided in the optical unit 20 in a manner that the light-blocking portion 50 is arranged between the light source 21 and the user 100 when the user 100 faces the overhead image reading apparatus 1 with the medium S to be read therebetween. Thus, the light-blocking portion 50 is provided at a position closer to the rotation axis X than the light source 21 is.

Furthermore, the light-blocking portion 50 extends downward from the body 23 of the optical unit 20, and is further movable in a manner that the protruding amount from the body 23 varies. Thus, the overhead image reading apparatus 1 according to the second embodiment includes a light-blocking-portion drive unit 55 capable of moving the light-blocking portion 50, and the light-blocking portion 50 is formed so that the downward protruding amount thereof from the body 23 is varied or adjusted by the drive force generated by the light-blocking-portion drive unit 55.

The light-blocking-portion drive unit 55 includes, for example, a driving unit such as an electric motor, and a transmission part connecting a rotary shaft of the motor and the light-blocking-portion drive unit 55, similarly to the drive unit 31 that rotates the optical unit 20. The light-blocking-portion drive unit 55 can also be controlled by the control unit 30 via the input/output interface unit 33 similarly to the drive unit 31, and the light-blocking portion 50 can be moved by controlling the light-blocking-portion drive unit 55 by the control unit 30.

The control unit 30 controls the light-blocking-portion drive unit 55 so that the light-blocking portion 50 can move with rotation of the light source 21, that is, with rotation of the optical unit 20. Thus, the control unit 30 moves the light-blocking portion 50 with rotation of the light source 21 by making the light-blocking-portion drive unit 55 cooperate with the drive unit 31 that rotates the optical unit 20.

The overhead image reading apparatus 1 according to the second embodiment has such a configuration as described above, and the operation thereof will be described below. When reading of the medium S to be read is performed with the overhead image reading apparatus 1, the rotational position of the optical unit 20 is initially set to the furthest reading position. In this state, the control unit 30 controls the light-blocking-portion drive unit 55 to adjust the protruding amount from the body 23 so that the position of an end of the light-blocking portion 50 in the vertical direction comes to a position approximate to that of the optical-axis center 21c of the lens 21b of the light source 21. The control unit 30 performs reading of the medium S to be read by controlling the light source 21 and the image-capturing unit 22 after setting the light-blocking portion 50 in this state.

When reading of the medium S to be read is performed, light is emitted from the light source 21, and part of the light from the light source 21 travels toward the user 100 as the diffused-component R. However, the light emitted toward the user 100 is blocked by the light-blocking portion 50. Furthermore, as a result of blocking the diffused-component R by the light-blocking portion 50 in this manner, the upper-end position Rt of the light emitted toward the user 100 is lowered to a position lower than the unblocked-upper-end position Rn.

Figure 12:
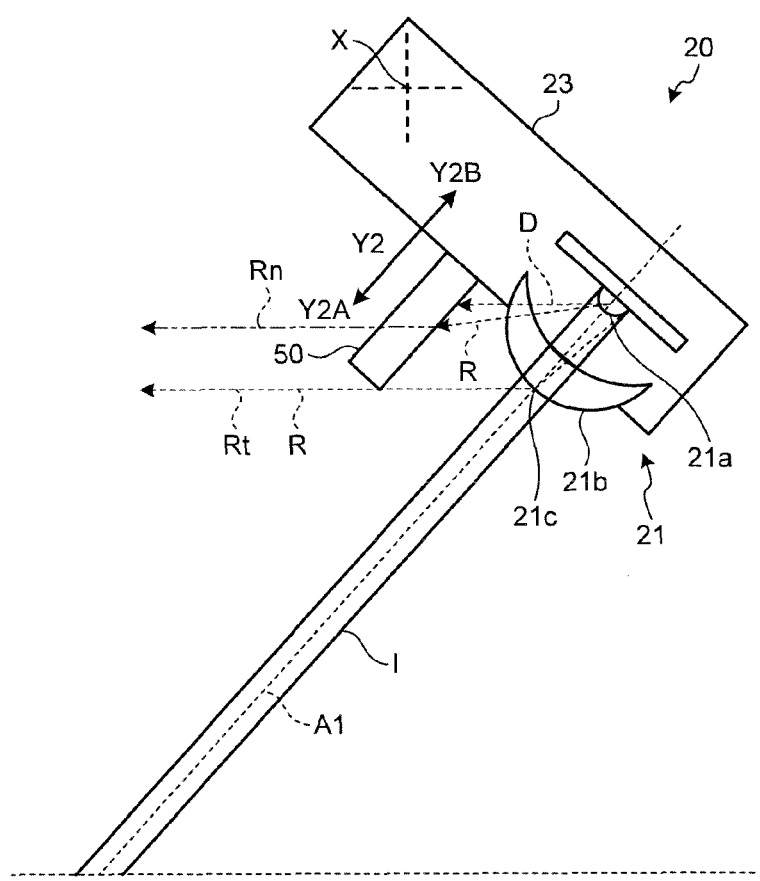
FIG. 12 is an explanatory diagram illustrating a light blocking state of the light-blocking portion immediately before reading is completed.

FIG. 12 is an explanatory diagram illustrating a light blocking state of the light-blocking portion 50 immediately before reading is completed. When reading of the medium S to be read is performed by the overhead image reading apparatus 1, reading is performed while rotating the optical unit 20 about the rotation axis X so that the direction of the optical axis Al of the light source 21 becomes a direction tilted toward the user 100 as compared to that at the start of reading. As a result, the irradiating directions of the line-irradiating component I and the diffused-component R also become directions tilted toward the user 100 as compared to those at the start of reading.

Meanwhile, the control unit 30 controls the light-blocking-portion drive unit 55 so that the protruding amount of the light-blocking portion 50 increases as shown in direction Y2A of arrow Y2 during reading of the medium S to be read. Specifically, since the light-blocking portion 50 is provided nearer to the rotation axis X than the light source 21 is, with respect to a connecting part that connects the light-blocking portion 50 with the body 23, a change in the height in the vertical direction at the connecting part is smaller than that in the height of the light source 21 when the optical unit 20 is rotated about the rotation axis X in a direction in which the light source 21 moves downward.

Thus, the amount by which the light-blocking portion 50 moves downward when the optical unit 20 is rotated is smaller than the amount by which the light source 21 moves downward. For this reason, when the optical unit 20 is rotated, the protruding amount of the light-blocking portion 50 from the body 23 is increased so as to compensate for the difference between the amount of variation of the light-blocking portion 50 and that of the light source 21 in the vertical direction. Specifically, the protruding amount of the light-blocking portion 50 from the body 23 is increased so that the position of an end of the light-blocking portion 50 in the vertical direction comes to a position approximate to that of the optical-axis center 21c of the lens 21b of the light source 21. Thus, the light-blocking portion 50 is movable or adjustable so as to maintain the upper-end position Rt of the light with the rotation of the light source 21.

As a result, the diffused-component R traveling from the light source 21 toward the user 100 is blocked by the light-blocking portion 50. Furthermore, when light is emitted by the light emitting portion 21a, light traveling toward the user 100 out of the direct-light component D that passes through the lens 21b without being diffused by the lens 21b is also blocked by the light-blocking portion 50. Thus, the upper-end position Rt of light from the light source 21 including the direct-light component D is lowered by the light-blocking portion 50 with the increased protruding amount. As a result, light emitted from the light source 21 is less likely to get in the eyes of the user 100 even when the optical unit 20 comes to the rotational position of the nearest reading position during reading of the medium S to be read.

Next, an outline of procedures for operation of the overhead image reading apparatus 1 according to the second embodiment will be described.

Figure 13:
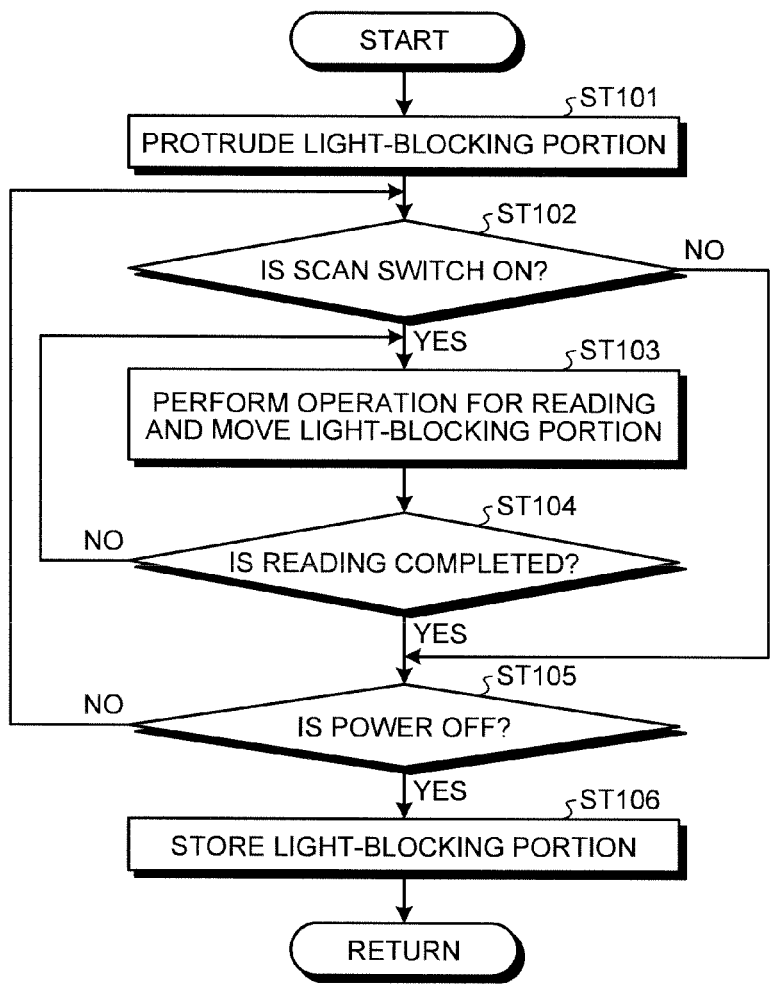
FIG. 13 is a flowchart illustrating operation of the overhead image reading apparatus according to the second embodiment.

FIG. 13 is a flowchart illustrating operation of the overhead image reading apparatus according to the second embodiment. When the power switch is turned on for using the overhead image reading apparatus 1 according to the second embodiment, the light-blocking portion 50 is first made to protrude by controlling the light-blocking-portion drive unit 55 by the control unit 30 (step ST101). That is, the state of the light-blocking portion 50 is set to the state at the start of reading with the overhead image reading apparatus 1. Specifically, the light-blocking portion 50 is made to protrude in direction Y2A until the position of an end of the light-blocking portion 50 in the vertical direction comes to a position approximate to that of the optical-axis center 21c of the lens 21b of the light source 21.

Next, it is determined whether or not the scan switch is turned on (step ST102). That is, it is determined whether or not input operation to start reading is performed. When it is determined that the scan switch is turned on as a result of this determination (Yes in step ST102), operation for reading is performed and the light-blocking portion 50 is moved (step ST103). That is, the light source 21 is turned on, and the optical unit 20 is rotated while the image-capturing unit 22 is capturing the image of the medium S to be read. Furthermore, the light-blocking portion 50 is moved and the protruding amount of the light-blocking portion 50 from the body 23 of the optical unit 20 is varied with the rotation of the optical unit 20 so as to maintain the upper-end position Rt of light traveling toward the user 100.

Next, it is determined whether or not the rotational position of the optical unit 20 has reached the nearest reading position and reading of the medium S to be read is completed (step ST104). When it is determined that reading is not completed as a result of this determination (No in step ST104), moving the light-blocking portion 50 while performing operation for reading is repeated (step ST103).

When, on the other hand, it is determined that reading is completed (Yes in step ST104) or when it is determined that the scan switch is not turned on (No in step ST102), it is determined whether or not the power switch is turned off (step ST105). When it is determined that the power switch is not turned off as a result of this determination (No in step ST105), the determination as to whether or not the scan switch is turned on is repeated (step ST102).

When, on the other hand, it is determined that the power switch is turned off (Yes in step ST105), the light-blocking portion 50 is moved in direction Y2B and stored (step ST106). That is, the light-blocking portion 50 is stored in the body 23 into a non-use state.

With the overhead image reading apparatus 1 according to the second embodiment described above, since the light-blocking portion 50 is moved with rotation of the light source 21, it is possible to prevent light from the light source 21 from directly getting in the eyes of the user 100 even when the light source 21 rotates. As a result, it is possible to prevent the user 100 from being dazzled with an unpleasant feeling by the light from the light source 21.

Furthermore, since the light-blocking portion 50 is moved with rotation of the light source 21 so as to maintain the upper-end position Rt of light, it is possible to prevent light from the light source 21 from directly getting in the eyes of the user 100 from beginning to end regardless of the rotating state of the light source 21. As a result, it is possible to more reliably prevent the user 100 from being dazzled with an unpleasant feeling.

Furthermore, since the protruding amount of the light-blocking portion 50 from the body 23 of the optical unit 20 varies being interlocked with the drive unit 31, it is possible to continuously prevent light from the light source 21 from directly getting in the eyes of the user 100 when the optical unit 20 is rotated. As a result, it is possible to more reliably prevent the user 100 from being dazzled with an unpleasant feeling.

MODIFIED EXAMPLES

While, in the second embodiment, the light-blocking portion 50 is interlocked with the drive unit 31 in the overhead image reading apparatus 1, in a modified example, the light-blocking portion 50 may be capable of moving independently of the operation of the drive unit 31. Modes of operation of the light-blocking portion 50 may be set to a suitable mode according to the specification and the manufacturing cost of the overhead image reading apparatus 1, such as gradually changing the protruding amount from the body 23 of the optical unit 20 or changing the protruding amount according to the light intensity or brightness of light traveling from the light source 21 toward the user 100.

Furthermore, while the light-blocking portion 25, 50 is attached to the optical unit 20 and configured to rotate with the light source 21 in the overhead image reading apparatus 1 according to the first and second embodiments described above, the light-blocking portion may be fixed to the overhead image reading apparatus 1. For example, the light-blocking portion may be attached to the holder 13 of the body 10 as a member separate from the optical unit 20 that does not rotate with the optical unit 20. As a result of fixing the light-blocking portion in this manner, the manufacturing cost can be lowered.

Furthermore, while the overhead image reading apparatus 1 in which the rotation axis X of the optical unit 20 is positioned closer to the user 100 than the light source 21 and the image-capturing unit 22 is described as the overhead image reading apparatus 1 according to the first and second embodiments, the overhead image reading apparatus 1 may be in other forms. Any form of the overhead image reading apparatus 1 may be used as long as it is provided with a light-blocking portion capable of preventing light from the light source 21 from getting in the eyes of the user 100 while the light source 21 is rotated. For example, such an overhead image reading apparatus may have a configuration where the rotation axis X of the optical unit 20 is disposed at a part which is other than a part on the side of the user 100.

Figure 14:
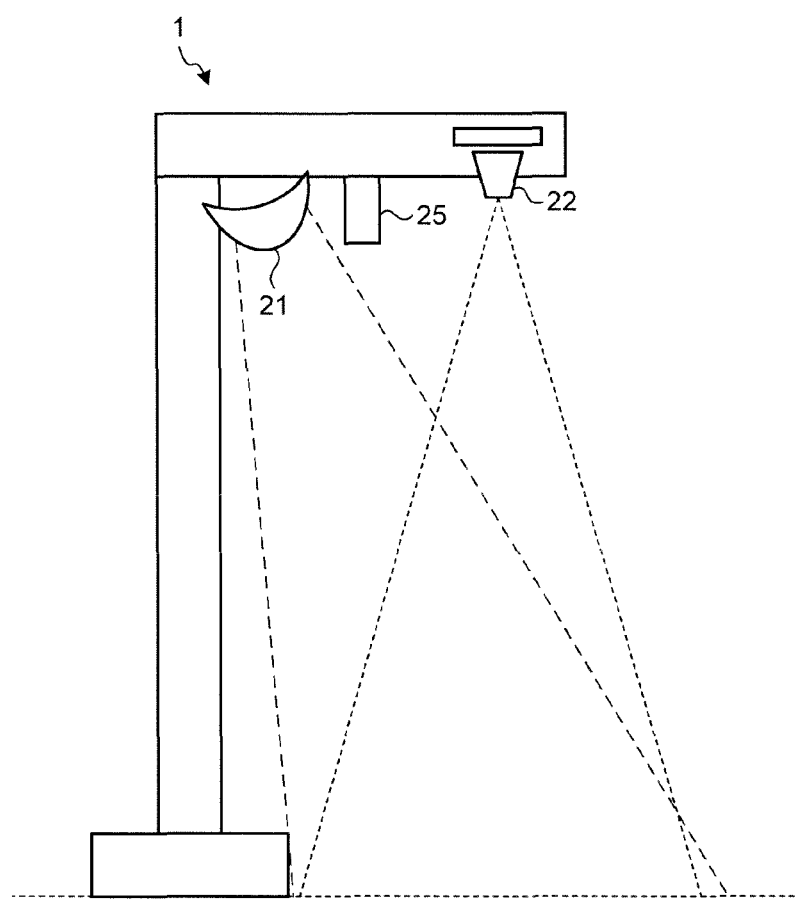
FIG. 14 is a side view of an overhead image reading apparatus according to a modified example.
Figure 15:
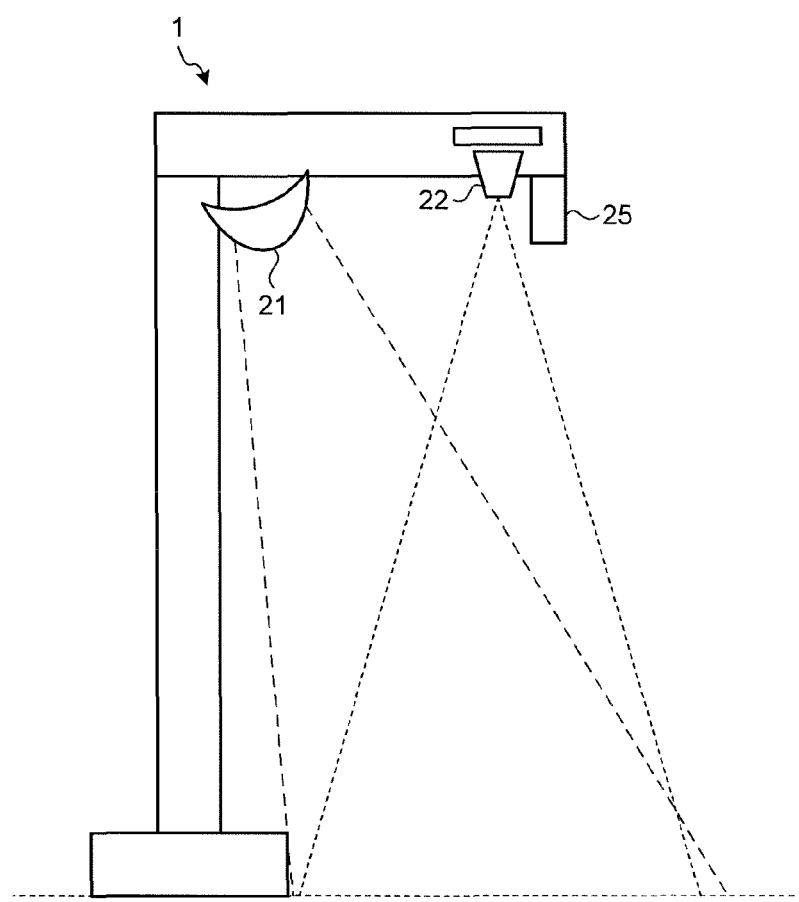
FIG. 15 is a side view of an overhead image reading apparatus according to a modified example.
Figure 16:
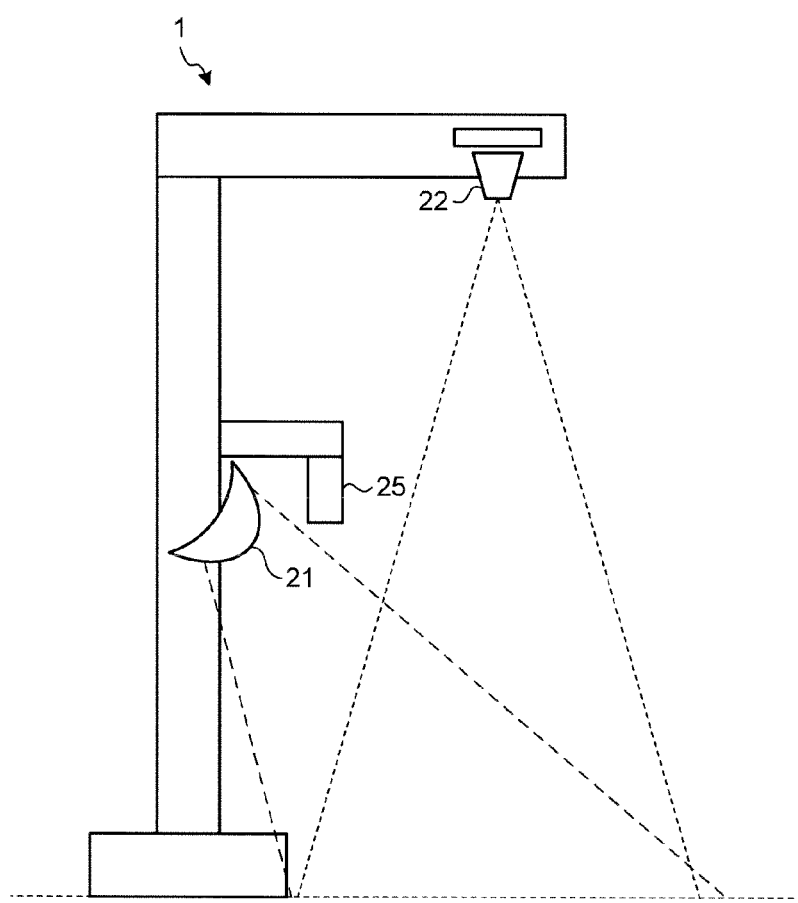
FIG. 16 is a side view of an overhead image reading apparatus according to a modified example.

In addition, the optical unit 20 may be configured not to rotate. FIGS. 14 to 16 are side views of overhead image reading apparatuses according to modified examples. For example, the light source 21 and the image-capturing unit 22 may be fixed in a state separated from each other in the horizontal direction as illustrated in FIGS. 14 and 15. In this case, the light-blocking portion 25 may be arranged between the light source 21 and the image-capturing unit 22 as illustrated in FIG. 14 or may be arranged closer to the user 100 than both of the light source 21 and the image-capturing unit 22 as illustrated in FIG. 15.

Furthermore, the positions in the vertical direction of the light source 21 and the image-capturing unit 22 may be different, or the light source 21 may be arranged downward, in the vertical direction, of the image-capturing unit 22 as illustrated in FIG. 16. In this case, the light-blocking portion 25 is arranged at a position in the vertical direction approximate to that of the light source 21 and closer to the user 100 than the light source 21. Even when the light source 21 and the image-capturing unit 22 are provided in a non-rotatable manner as in these cases, the light-blocking portion 25 may be provided between the light source 21 and the user 100.

Furthermore, the overhead image reading apparatus 1 may have the configurations, controls and the like used in the first and second embodiments and the modified examples described above in combination or may use configurations and controls other than those described above. As a result of providing a light-blocking portion that lowers the upper-end position Rt of light emitted from the light source 21 regardless of the configuration and the control method of the overhead image reading apparatus 1, it is possible to prevent the user 100 from being dazzled with an unpleasant feeling by the light from the light source 21.

An overhead image reading apparatus according to the present invention includes an image-capturing unit that captures an image of a medium to be read from above when the medium to be read is placed on a placement surface; a light source that irradiates the medium to be read with light when the image-capturing unit captures the image of the medium to be read; and a light blocking member that blocks light above an upper-end position of light emitted from the light source. The upper-end position of light emitted from the light source is lowered by the light blocking member, which can prevent the user from seeing light from the light source with his/her eyes while the image-capturing unit reads a medium to be read. This produces an advantageous effect that it is possible to prevent the user from being dazzled with an unpleasant feeling by light from the light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An overhead image reading apparatus comprising:
    an image-capturing unit configured to capture an image of a medium to be read from above when the medium to be read is placed on a placement surface;
    a light source configured to irradiate the medium with light when the image-capturing unit captures the image of the medium,
    a light blocking member configured to block light above an upper-end position of light emitted from the light source;
    a rotating mechanism configured to rotate the image-capturing unit and the light source, wherein
    the light blocking member is provided at a position which is forward in a rotating direction of the light source, and blocks the light above the upper-end position of light emitted from the light source when the image-capturing unit captures the image of the medium to be read.

2. The overhead image reading apparatus according to claim 1, wherein the light blocking member is movable with rotation of the light source.

3. The overhead image reading apparatus according to claim 1, wherein the light blocking member is movable with rotation of the light source so as to maintain the upper-end position of light.

4. The overhead image reading apparatus according to claim 1, wherein the light blocking member is interlocked with the rotating mechanism.

5. The overhead image reading apparatus according to claim 1, wherein the light blocking member is configured to operate independently of operation of the rotating mechanism.

6. An overhead image reading apparatus comprising:
    an image-capturing unit configured to capture an image of a medium to be read from above when the medium to be read is placed on a placement surface;
    a light source configured to irradiate the medium with light when the image-capturing unit captures the image of the medium; and
    a light blocking member configured to block light above an upper-end position of light emitted from the light source, wherein
    an upper-end position of light emitted from the light source that is lowered by the light blocking member is equal to or lower than a level of the light source.

7. The overhead image reading apparatus according to claim 6, wherein
    the light source includes a light emitting portion and a lens arranged below the light emitting portion, and
    an upper-end position of light emitted from the light source that is lowered by the light blocking member is equal to or lower than a level of an optical-axis center of the lens.

* * * * *